United States Patent
Gleyzer et al.

(10) Patent No.: US 9,921,870 B2
(45) Date of Patent: Mar. 20, 2018

(54) SYSTEM AND METHOD FOR SUPPORTING A SCALABLE THREAD POOL IN A DISTRIBUTED DATA GRID

(71) Applicant: Oracle International Corporation, Redwood Shores, CA (US)

(72) Inventors: Gene Gleyzer, Lexington, MA (US); Jason Howes, Somerville, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 136 days.

(21) Appl. No.: 14/857,458

(22) Filed: Sep. 17, 2015

(65) Prior Publication Data

US 2016/0092268 A1     Mar. 31, 2016

Related U.S. Application Data

(60) Provisional application No. 62/055,477, filed on Sep. 25, 2014, provisional application No. 62/055,476, filed on Sep. 25, 2014.

(51) Int. Cl.
G06F 9/46        (2006.01)
G06F 9/445       (2018.01)
(Continued)

(52) U.S. Cl.
CPC ............ *G06F 9/46* (2013.01); *G06F 9/44505* (2013.01); *G06F 9/4881* (2013.01);
(Continued)

(58) Field of Classification Search
None
See application file for complete search history.

(56) References Cited

U.S. PATENT DOCUMENTS 7,565,651 B1 *   7/2009   Carey ................... G06F 9/4881
                                              718/100
7,937,499 B1 *   5/2011   Tripathi ................. G06F 13/24
                                              709/232
(Continued)

OTHER PUBLICATIONS

European Patent Office, International Searching Authority, International Search Report and Written Opinion for International Application No. PCT/US2015/050976 dated Dec. 16, 2015, 14 pages.
(Continued)

*Primary Examiner* — Hiren Patel
(74) *Attorney, Agent, or Firm* — Tucker Ellis LLP

(57) ABSTRACT

A system and method for supporting a scalable thread pool in a multi-threaded processing environments such as a distributed data grid. A work distribution system utilizes a collection of association piles to hold elements communicated between a service thread and multiple worker threads. Worker threads associated with the association piles poll elements in parallel. Polled elements are not released until returned from the worker thread. First in first out ordering of operations is maintained with respect to related elements by ensuring related elements are held in the same association pile and preventing polling of related elements until any previously polled and related elements have been released. By partitioning the elements across multiple association piles while ensuring proper ordering of operations with respect to related elements the scalable thread pool enables the use of large thread pools with reduced contention compared to a conventional single producer multiple consumer queue.

20 Claims, 8 Drawing Sheets

(51) Int. Cl.
    *G06F 9/48*     (2006.01)
    *G06F 9/50*     (2006.01)

(52) U.S. Cl.
    CPC .... *G06F 9/5027* (2013.01); *G06F 2209/5011* (2013.01); *G06F 2209/5018* (2013.01)

(56) References Cited

U.S. PATENT DOCUMENTS

| | | | | |
|---|---|---|---|---|
| 2003/0195920 | A1* | 10/2003 | Brenner | G06F 9/4881 718/107 |
| 2004/0045002 | A1* | 3/2004 | Berger | G06F 9/4881 718/102 |
| 2004/0139434 | A1 | 7/2004 | Blythe et al. | |
| 2008/0114973 | A1* | 5/2008 | Norton | G06F 9/485 712/228 |
| 2009/0070772 | A1* | 3/2009 | Shikano | G06F 9/5027 718/106 |
| 2009/0259660 | A1* | 10/2009 | Novy | G05B 19/41865 |
| 2010/0005468 | A1 | 1/2010 | Chang | |
| 2010/0115196 | A1* | 5/2010 | Hamilton | G06F 9/466 711/108 |
| 2011/0296212 | A1* | 12/2011 | Elnozahy | G06F 1/3203 713/320 |
| 2012/0060172 | A1 | 3/2012 | Abouzour | |
| 2012/0102501 | A1* | 4/2012 | Waddington | G06F 9/5061 718/105 |
| 2014/0181826 | A1* | 6/2014 | Wolf | G06F 9/4843 718/102 |
| 2014/0298346 | A1* | 10/2014 | Zakashansky | G06F 9/5033 718/104 |
| 2015/0135183 | A1* | 5/2015 | Kipp | G06F 9/46 718/103 |
| 2015/0169380 | A1* | 6/2015 | Inoue | G06F 9/3885 718/105 |
| 2015/0339168 | A1* | 11/2015 | Mason | G06F 9/5027 718/104 |
| 2016/0335135 | A1* | 11/2016 | Jang | G06F 9/524 |

OTHER PUBLICATIONS

Ji Hoon Kim et al., "Prediction-Based Dynamic Thread Pool Management of Agent Platform for Ubiquitous Computing", Jul. 11, 2007, Ubiquitous Intelligence and Computing; Lecture Notes in Computer Science, Springer Berlin Heidelberg, Berlin, Heidelberg, 10 pages.

\* cited by examiner

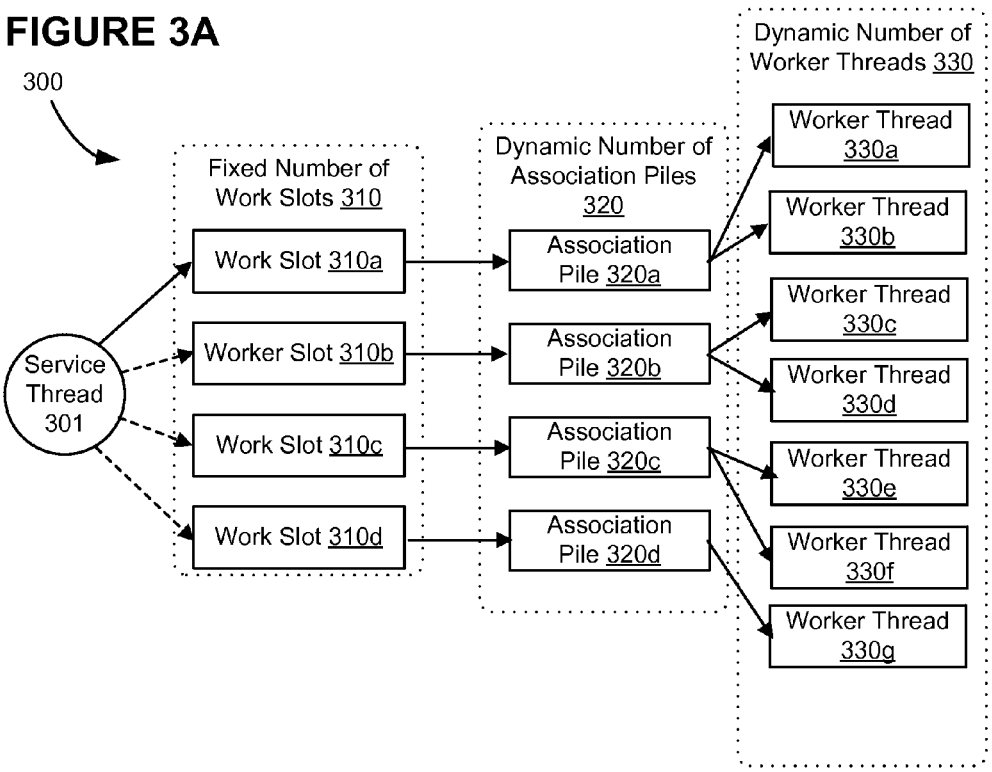
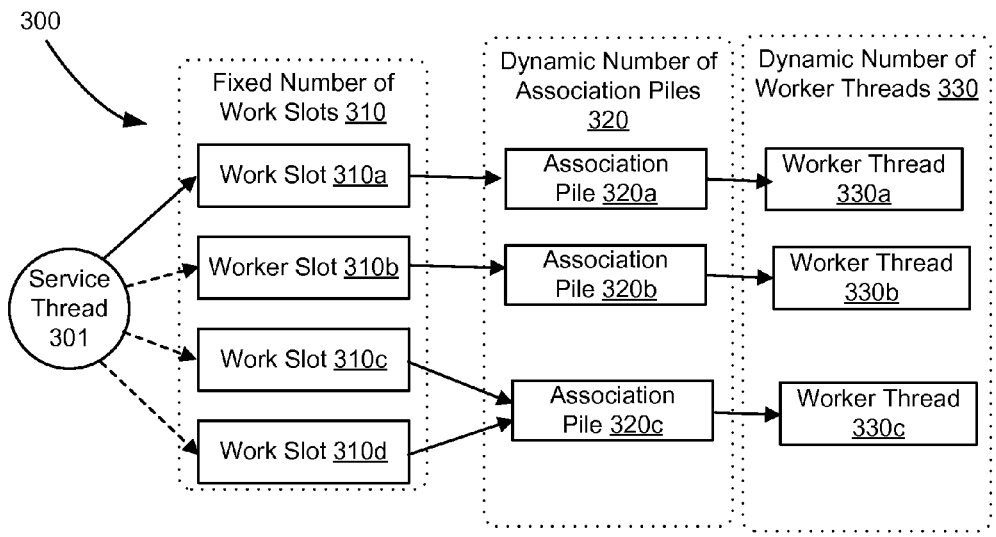

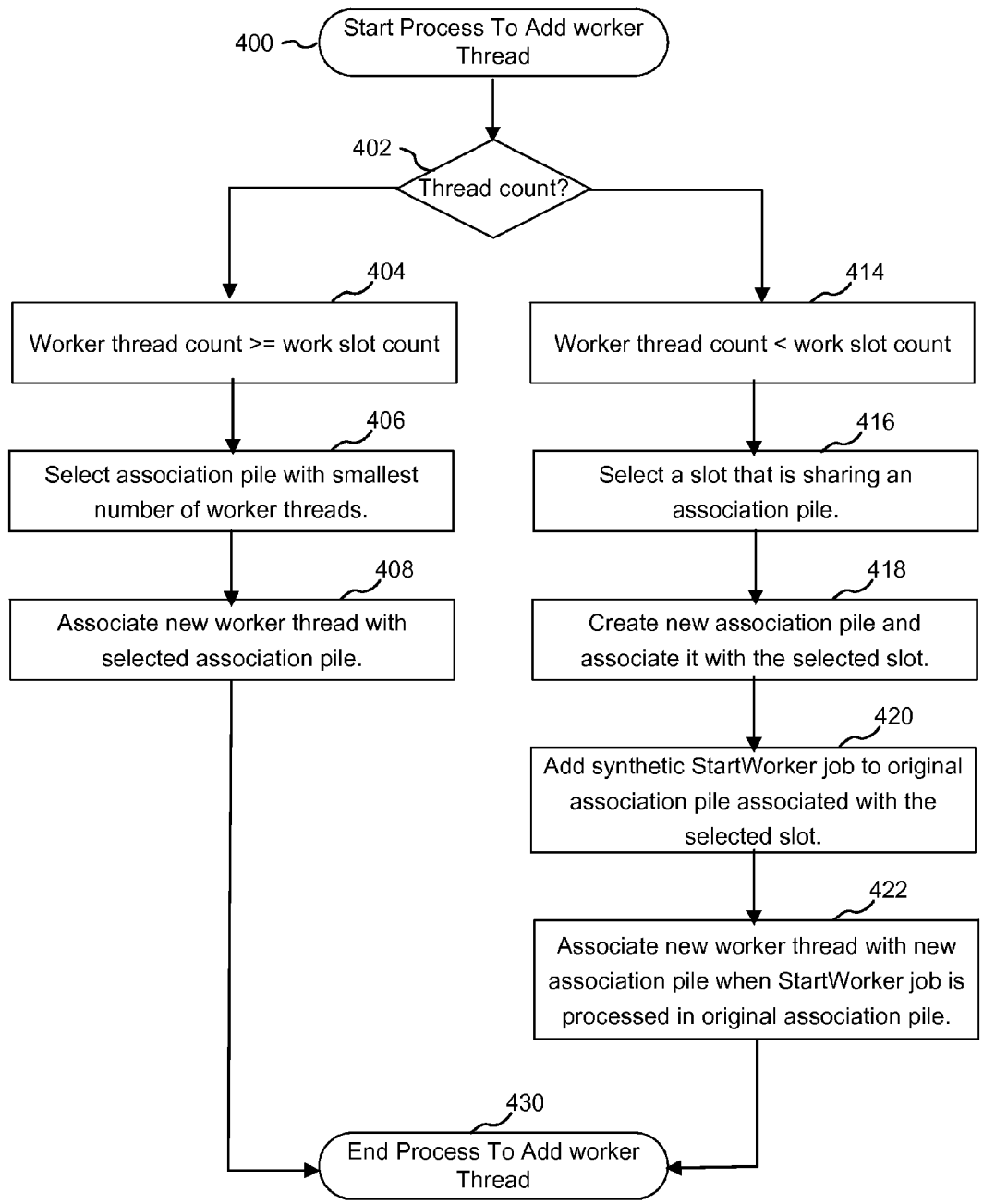

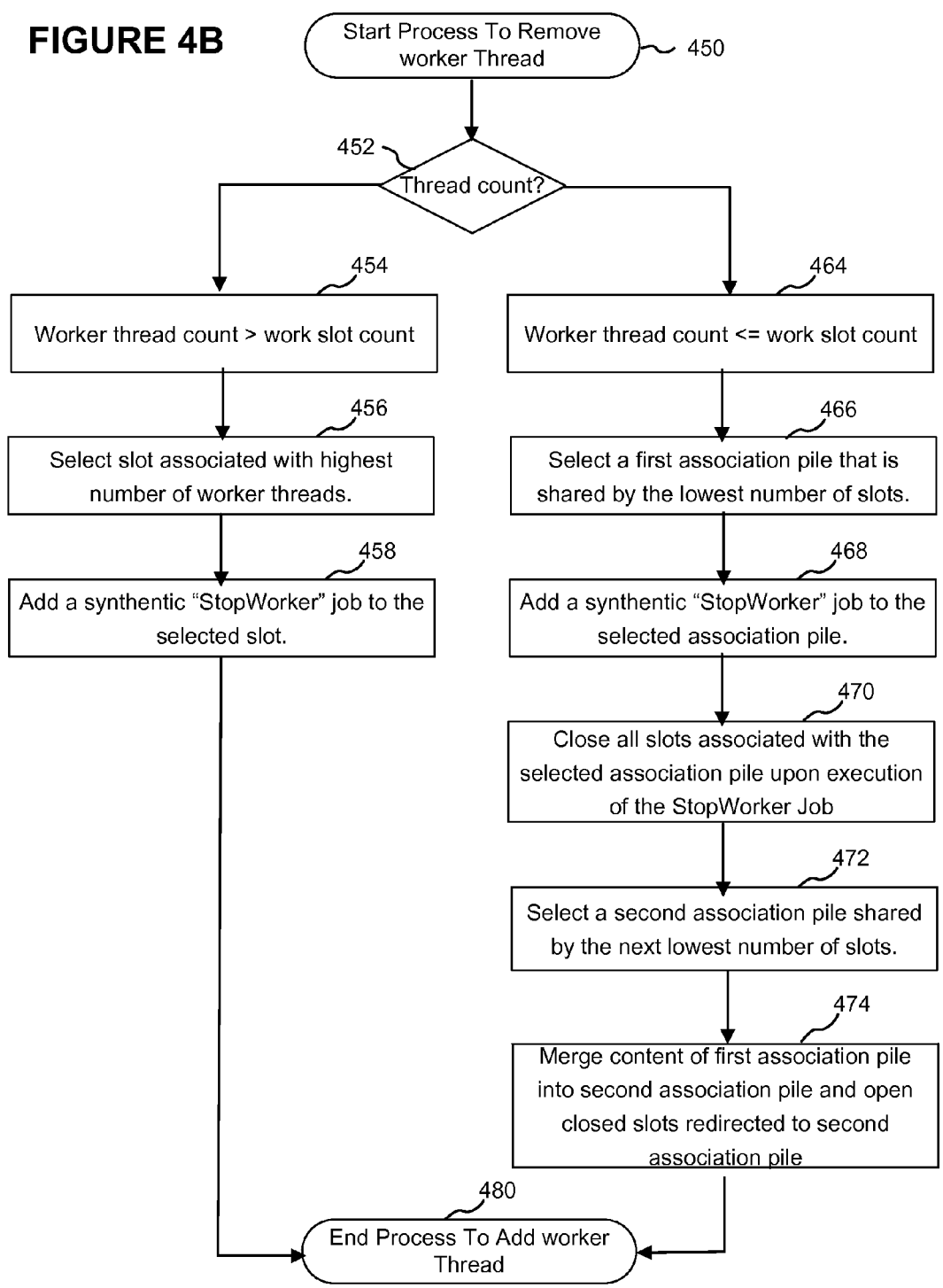

US 9,921,870 B2

SYSTEM AND METHOD FOR SUPPORTING A SCALABLE THREAD POOL IN A DISTRIBUTED DATA GRID

CLAIM OF PRIORITY

This application claims priority to U.S. Provisional Patent Application No. 62/055,476, entitled "SYSTEM AND METHOD FOR SUPPORTING DYNAMIC THREAD POOL SIZING IN A DISTRIBUTED DATA GRID" filed Sep. 25, 2014, and U.S. Provisional Patent Application No. 62/055,477, entitled "SYSTEM AND METHOD FOR SUPPORTING A SCALABLE THREAD POOL IN A DISTRIBUTED DATA GRID" filed Sep. 25, 2014 which applications are incorporated herein by reference.

CROSS REFERENCE TO RELATED APPLICATIONS

This application is related to the following patent application, which is hereby incorporated by reference in its entirety: U.S. Patent Application titled "SYSTEM AND METHOD FOR SUPPORTING DYNAMIC THREAD POOL SIZING IN A DISTRIBUTED DATA GRID", application Ser. No. 14/857,452, filed Sep. 17, 2015.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

SUMMARY

Described herein are systems and methods that can support a scalable thread pool in a distributed data grid. As described in the description of a distributed data grid which follows, services provided by a node of a distributed data grid typically use one service thread to provide the specific functionality of the service. Some services optionally support a thread pool of worker threads that can be configured to provide the service thread with additional processing resources. The present disclosure describes a scalable thread pool of worker threads that can be configured to provide the service thread with additional processing resources.

Described herein are systems and methods for supporting a scalable thread pool in a multi-threaded processing environments such as a distributed data grid. A work distribution system utilizes a collection of association piles to hold elements communicated between a service thread and multiple worker threads. Worker threads associated with the association piles poll elements in parallel. Polled elements are not released until returned from the worker thread. First in first out ordering of operations is maintained with respect to related elements by ensuring related elements are held in the same association pile and preventing polling of related elements until any previously polled and related elements have been released. By partitioning the elements across multiple association piles while ensuring proper ordering of operations with respect to related elements the scalable thread pool enables the use of large thread pools with reduced contention compared to a conventional single producer multiple consumer queue. Systems and methods for scaling the size of the thread pool by adding and removing threads are also described.

Described herein are systems and methods that can support thread pool management in a distributed data grid. The system can use an association pile to hold one or more elements. Furthermore, the system allows multiple threads to poll elements from an association pile in parallel. Additionally, the system can prevent an element, which is held in the association pile and is with an association, from being polled until one or more previously polled associated elements have been released.

These and other objects and advantages of the present invention will become apparent to those skilled in the art from the following description of the various embodiments, when read in light of the accompanying drawings.

BRIEF DESCRIPTION OF THE FIGURES

FIGS. 3A and 3B illustrate a scalable thread pool system and method in accordance with an embodiment of the invention.

FIG. 4A illustrates a method for adding worker threads to the scalable thread pool system of FIGS. 2, 3A, and 3B, in accordance with an embodiment of the invention.

FIG. 4B illustrates a method for removing worker threads from the scalable thread pool system of FIGS. 2, 3A, and 3B, in accordance with an embodiment of the invention.

DETAILED DESCRIPTION

Figure 1:
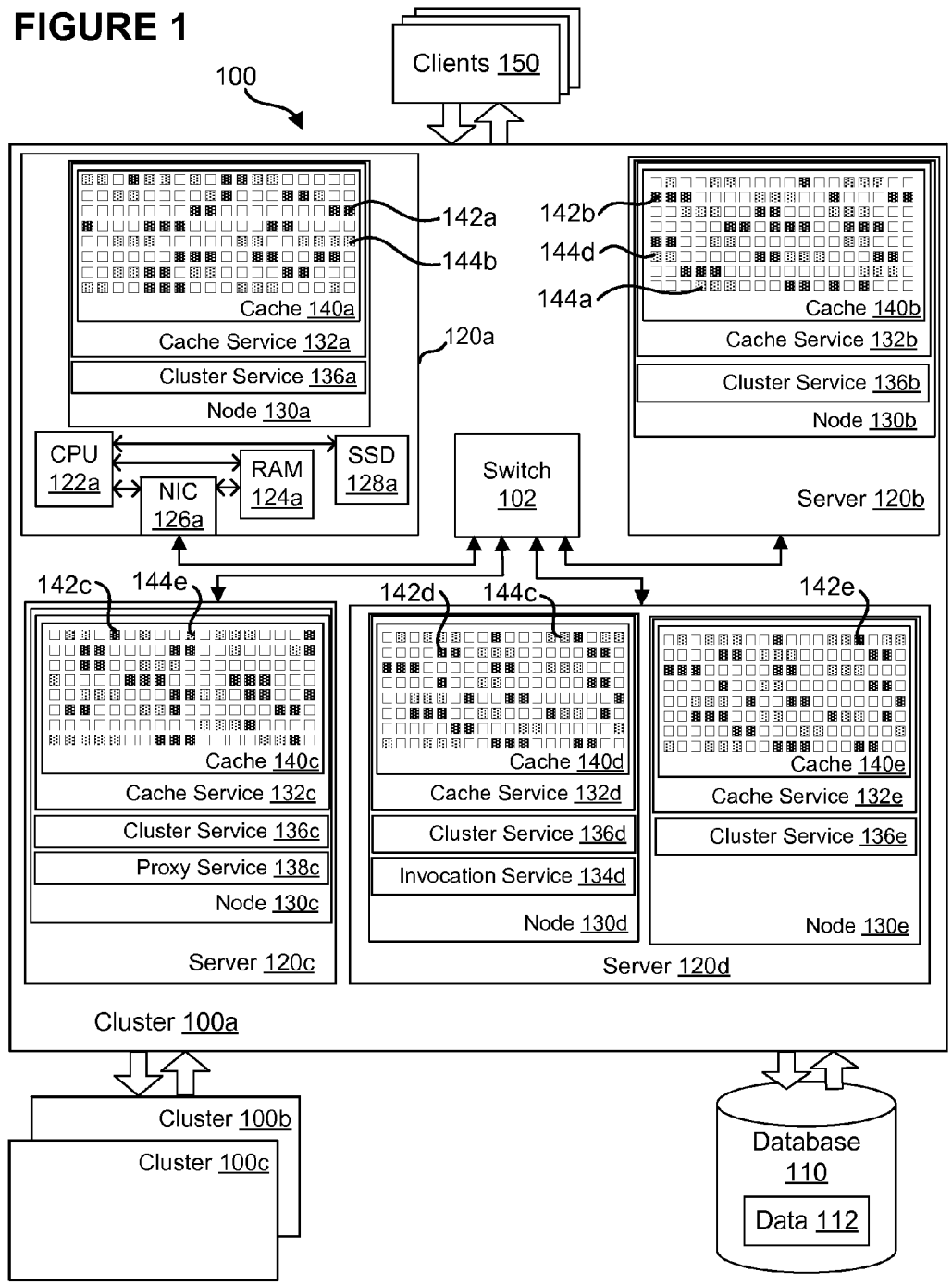
FIG. 1 illustrates a distributed data grid, in accordance with an embodiment of the invention.

Described herein are systems and methods that can support a scalable thread pool in a distributed data grid. As described in the description of a distributed data grid which follows, services provided by a node of a distributed data grid typically uses one service thread to provide the specific functionality of the service. Some services optionally support a thread pool of worker threads that can be configured to provide the service thread with additional processing resources/bandwidth. The present disclosure describes a scalable thread pool of worker threads that can be configured to provide the service thread with additional processing resources and a system and method for dynamic resizing of the scalable thread pool. The system and methods for providing a scalable thread pool as described herein have particular utility in the distributed data grid described below with respect to FIG. 1. The scalable thread pool disclosed herein may also be applied in wide variety of multi-threaded processing environments and applications.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described below, without departing from the scope of the invention.

FIG. 1 illustrates and example of a distributed data grid 100 which stores data and provides data access to clients 150. A "data grid cluster", or "distributed data grid", is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, a distributed data grid provides data storage and management capabilities by distributing data over a number of servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more. Server 120a is illustrated as having CPU 122a, Memory 124a and NIC 126a (these elements are also present but not shown in the other Servers 120b, 120c, 120d). Optionally each server may also be provided with flash memory—e.g. SSD 128a—to provide spillover storage capacity. When provided the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better).

A cluster 100a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 102 which provides single hop communication between servers. A cluster may thus be limited by the number of ports on the switch 102. A typical cluster will therefore include between 4 and 96 physical servers.

In most Wide Area Network (WAN) configurations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. The distributed cache service manages distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

In embodiments of the present invention, the distributed data grid 100 of FIG. 1 implements one or more scalable thread pool system and method as described below and illustrated in FIGS. 2, 3A, 3B, 4A, 4B. In embodiments of the present invention, distributed data grid 100 implements one or more system and method for dynamic resizing of a scalable thread pool as described below and illustrated in FIGS. 5 and 6. In particular embodiments, the scalable thread pool system and method and/or the system and method for dynamic resizing of a scalable thread pool may be implemented with respect to one or more service thread operating on nodes of the distributed data grid 100, including for example, the cache service thread, and proxy service thread.

Thread Pools

Described herein are systems and methods that can support a scalable thread pool in a distributed data grid. As described in the description of a distributed data grid provided above, services provided by a node of a distributed data grid typically uses one service thread to provide the specific functionality of the service. Some services optionally support a thread pool of worker threads that can be configured to provide the service thread with additional processing resources. The present disclosure describes a scalable thread pool of worker threads that can be configured to provide the service thread with additional processing resources. The scalable thread pool may optionally be used in conjunction with the system and method for dynamic sizing/resizing of the scalable thread pool described herein.

A distributed data grid, as described above, is configured to process very large numbers of short tasks received from clients. For example, the service thread of a distributed cache service is configured to process very large numbers of storage operation requests such as put, get, etc. received from applications or other nodes the network. The processing of each storage operation is short-lived, however, the number of storage operations is very large. In order to efficiently process the very large number of short-lived operations, a service thread such as the service thread for the cache service can utilize a thread pool of worker threads.

If the number of tasks is very large, such as in a distributed data grid, then creating a thread for each task is impractical. Moreover if the size of the tasks is small, the overhead associated with creating and destroying a thread is more significant relative to the actual work performed. In a thread pool, worker threads are recycled instead of created on demand as tasks are received. Using a thread pool of worker threads is advantageous compared to creating new worker threads for each task because a thread pool allows reusing threads for multiple operations, thus the overhead associated with thread-creation and removal is spread over many operations. Using at thread pool to reduce overhead associated with thread creation and removal, may result in better performance and better system stability. As an additional advantage, processing of a task is not delayed by the need to create a new thread to process it. Typically, there are many more tasks than threads. As soon as a thread completes its task, it will request the next task from the queue until all tasks have been completed. The thread can then terminate, or sleep, until there are new tasks available.

In general, the optimum size for a thread pool depends on the number of processor cores available to a process and the nature and volume of the work. Creating and destroying a thread and its associated resources is an expensive process in terms of time. However, keeping an excessive number of threads alive will also waste memory, and context-switching between the runnable threads also damages performance. Having too many threads in a thread pool is wasteful of system resources as many of the threads will be idle. Having two few thread in a thread pool causes delay as tasks are required to wait until a thread becomes available. It is desirable to select a thread pool size which minimizes both waste of resources due to idle threads and delays caused by too few threads. Selecting an optimum thread pool size thus depends upon system performance and workload. Thus, it is desirable to provide a thread pool which is scalable such that the thread pool can have small number of threads for low workload situations and large numbers of threads for high workload situations.

When implementing a thread pool, thread-safety has to be taken into account. Tasks related to the same resource must be performed in order. If multiple threads pick up tasks related to the same resource only one of those thread will be able to proceed at a time. This is a disadvantageous because it negates the purpose of multiple threads—namely having multiple threads operating in parallel. Therefore techniques are required to ensure first-in-first-out FIFO ordering of tasks and prevent thread blocking/serialization—one common solution is a single producer multiple consumer queue—however the use of such a queue leads to its own sources of contention as described below. With a convention queue data structure the multiple consumer worker threads contend with each other for access to the queue. Only one worker thread can read from the queue at a time. Increasing the number of worker threads increases the contention on the queue. Thus, the single producer multiple consumer queue does not readily scale to large numbers of worker threads. Thus, a thread pool using a simple queue to communicate with a service thread is not scalable. It is therefore desirable to provide a data structure for providing work to worker threads that reduces and/or eliminates contention while allowing scaling of the thread pool while maintaining thread safety.

In view of the problems with conventional thread pools, the present disclosure describes a scalable thread pool of worker threads that can be configured to provide the service thread with additional processing resources and a system. In particular, the present disclosure describes a single producer multiple consumer dynamically scalable thread pool that exhibits high performance on multi-core systems and is suitable for providing a service thread of a distributed data grid with additional worker threads when required thereby improving performance of the distributed data grid. Furthermore, the present disclosure describes a data structure for providing work to worker threads that reduces and/or eliminates contention while allowing scaling of the thread pool. Thus the present disclosure describes a scalable thread pool which can have small number of threads for low workload situations and large numbers of threads for high workload situations.

Scalable Thread Pool System

Figure 2:
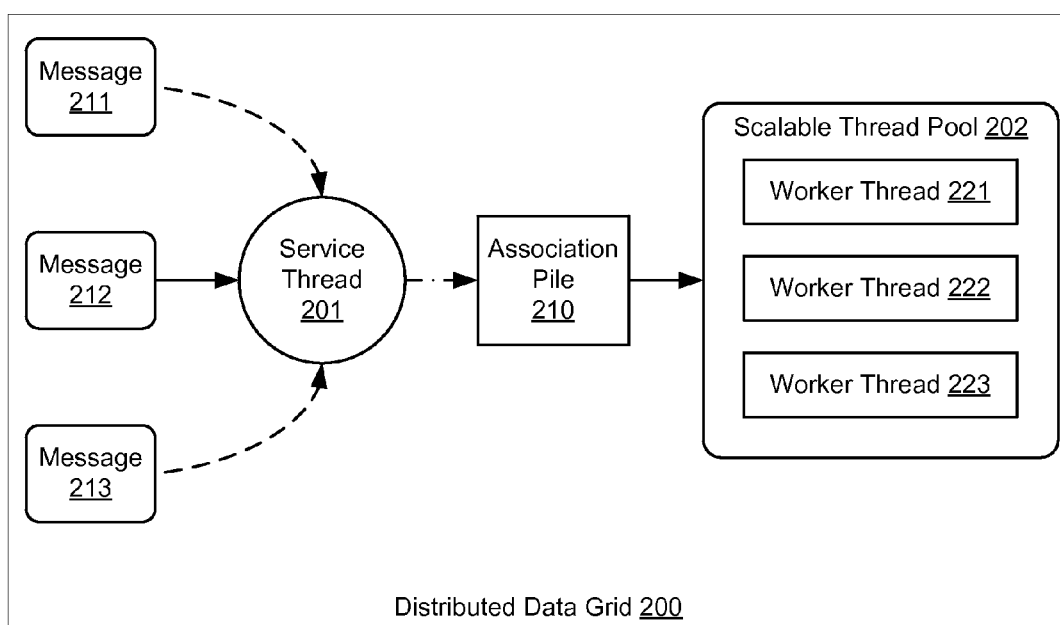
FIG. 2 illustrates a scalable thread pool system, in accordance with an embodiment of the invention.

FIG. 2 shows an overview of a scalable thread pool system suitable for use in a distributed data grid. As shown in FIG. 2, a service thread 201 in the distributed data grid 200 can receive one or more messages, e.g. messages 211-213. Furthermore, the service thread 201 can either process the messages 211-213, or provide the messages 211-213 to a scalable thread pool 202, which contains one or more worker threads 221-223. The system can use an association pile 210 to hold one or more elements (e.g. the messages 211-213). Furthermore, the system allows multiple threads (e.g. the worker threads 221-223) to poll elements from the association pile 210 in parallel. Additionally, the system can prevent an element, which is held in the association pile 210 and has an association with a previously polled element, from being polled until the previously polled associated elements has been released.

An association pile, such as association pile 210, is a data structure that holds elements in a loosely ordered way with a queue-like contract. The association pile respects the possibility that some elements can be associated with one another by way of an associated key. Elements associated with the same key should maintain first-in-first-out (FIFO) ordering, but may be re-ordered with respect to elements associated with different keys. The key may be, for example, the unique key which identifies a datum in the distributed data grid as described above. Only one thread can operate on a particular datum at a time and operations performed on a particular datum should be performed in the order they are received. Accordingly an association pile can, for an example, maintain first-in-first-out (FIFO) ordering of operations performed on a same datum associated with a same unique key.

Elements can be added to and removed from an association pile. Elements are added to the association pile by a calling thread. Elements are removed from an association pile by a worker thread. Removing an element is performed in two steps: first an available element is removed by a worker thread "polling" the association pile; second when the worker thread is finished with the element it is "released" from the association pile. The association pile assumes that polled-but not-yet-released elements are being processed in parallel on multiple threads and therefore prevents polling of any element associated with the same key as a polled-but not-yet-released element.

FIGS. 3A and 3B show an example of a scalable thread pool. As shown in FIGS. 3A and 3B, a service thread 300 is associated with a scalable thread pool 300. Thread pool 300 has of a fixed number (CPU count) of work slots 310. Four work slots 310a, 310b, 310c, and 310d are shown. Each work slot has a thread gate which can either be open or closed. When the thread gate is open a thread can enter and exit the gate. When a thread has entered a gate, the gate cannot be closed. When the thread gate is closed threads cannot enter the gate.

When work is added to the thread pool by the service thread, the work is distributed across the work slots. The service thread adds the work to the slot 310a, 310b, 310c, or 310d with the smallest backlog (i.e. the slot with the smallest association pile) with some randomness. However all work associated with the same key is added to the same slot in order to preserve ordering of associated work. When work is added to a work slot of a thread pool, the calling thread enters the thread gate of the work slot and adds the work to an association pile as described below.

A thread pool's fixed number (CPU count) of work slots are linked to one or more worker threads by way of one or more association pile. The thread pool has a dynamic number of association piles 320. Each work slot is associated with exactly one association pile. However multiple work slots may share the same association pile. When work is added to a work slot of the thread pool, the calling thread enters the thread gate of the work slot and adds the work to one of the association piles. All work added through a particular work slot is directed to the particular association pile associated with that work slot. All work related to a particular key is added through the same work slot and, thus, is directed to the same association pile.

A thread pool also has a dynamic number of worker threads 330. Each worker thread is associated with exactly one association pile. The worker threads poll work form the association piles. But, each worker thread only polls work from the one association pile with which the worker thread is associated. Multiple worker threads can be associated with the same association pile and poll work from it. As shown in FIGS. 3A and 3B, the number of worker threads and the number of association piles in the scalable thread pool can change over time as worker threads are added or removed according to the methods described with respect to FIGS. 4A, 4B, 5, 6.

FIG. 3A shows a configuration where the number of worker threads 330 is greater than the number of work slots 312. When there are more worker threads than work slots, the number of association piles equals the number of work slots. In the configuration of FIG. 3A there are seven active worker threads 330a, 330b, 330c, 330d, 330e, 330f, and 330g. Thus, as shown in FIG. 3A, because there are four work slots 310a, 310b, 310c, and 310d there are also four association piles 320a, 320b, 320c, and 320d. As shown in FIG. 3A, each work slot has a dedicated association pile into which a calling thread which enters the slot places work. All work related to a particular key is added through the same work slot and, thus, is directed to the same dedicated association pile. There are more worker threads than piles, therefore at least some of the worker threads 330a, 330b, 330c, 330d, 330e, 330f, and 330g need to share some of the association piles. That is to say more than one worker thread can be removing work from each association pile. For example, worker threads 330a and 330b both poll work from association pile 320a.

FIG. 3B shows a configuration where the number of worker threads 330 is less than the number of work slots 312. Where there are less worker threads than work slots, the number of association piles equals the number of worker threads. Thus, FIG. 3B shows three worker threads 330a, 330b, 330c and three association piles 320a, 320b, and 320c. There are more work slots 310 than association piles 320, so some work slots must share piles. For example, the calling threads that enter work slots 310c and 310d may both place work in association pile 320c. However, all work related to a particular key is added through the same work slot and, thus, is still directed to the same (shared) association pile. As shown in FIG. 3B, each worker thread however has a dedicated association pile from which it removes work. However, if a worker thread has nothing to do, it attempts to pull work from another thread's pile before going to sleep.

The scalable thread pool of worker threads described above can be configured to provide the service thread with additional processing resources and a system. In particular, the scalable thread pool exhibits high performance on multi-core systems and is suitable for providing a service thread of a distributed data grid with additional worker threads when required thereby improving performance of the distributed data grid. The data structure for providing work to worker threads comprising the work slots and association piles described above reduces and/or eliminates contention while allowing scaling of the thread pool. Thus the scalable thread pool which can have small number of threads for low workload situations and large numbers of threads for high workload situations. The scalable thread pool as described above has particular utility in the distributed data grid described below with respect to FIG. 1. The scalable thread pool disclosed herein may also be applied in wide variety of multi-threaded processing environments and applications.

Adding and Removing Threads

As described above the scalable thread pool can have small number of threads for low workload situations and large numbers of threads for high workload situations. A sizing/resizing mechanism can therefore be provided to determine how many threads are necessary or desirable in the thread pool at a particular point in time. The sizing/resizing mechanism is responsive to workload and/or throughput and adjusts the thread count to enhance performance of the thread pool by adding or removing threads from the thread pool. An embodiment of a sizing/resizing mechanism is described below, however the scalable thread pool may also be used with alternative sizing/resizing mechanisms to determine how/when to enhance performance of the thread pool by adding or removing threads from the thread pool.

The relationship between the worker threads, association piles, and worker threads is taken into consideration when adding worker threads and/or removing worker threads to the scalable thread pool of FIGS. 3A and 3B. It is important to maintain a balanced distribution of worker threads, slots, and association pools. Additionally, it is required to ensure that the properties of the thread pool are maintained such that where there are more worker threads than work slots, the number of association piles equals the number of work slots and where there are less worker threads than work slots, the number of association piles equals the number of work threads. Additionally, thread safety and the FIFO order of elements related to the same key must be preserved during changes to worker thread count and/or association pile count. FIGS. 4A and 4B illustrate methods for adding and removing worker threads to the scalable thread pool of FIGS. 3A and 3B in accordance with these objectives.

FIG. 4A shows a method of adding a worker thread to the scalable thread pool of FIGS. 3A and 3B in response to a determination that one or more threads should be added to the thread pool. At step 400, start the process to add a worker thread to the scalable thread pool. At step 402, compare the current thread count to the work slot count. If the determination is made 404 that the worker thread count>=work slot count, such as shown, for example, in FIG. 3A, proceed to step 406. If the worker thread count>=work slot count then it must be true that one or more association pile must be associated with more than one worker thread. At step 406, determine which association pile is shared by the smallest number of worker threads and select this pile (for example Association Pile 320d in FIG. 3A). At step 408, associate the pile selected in step 406 with a new worker thread. Then proceed to step 430 ending the process for adding a worker thread. This process makes sure the worker thread is added to the association pile which has the least number of worker threads.

If the determination is made 414 that the worker thread count<work slot count, such as shown, for example in FIG. 3B then proceed to step 416. As illustrated in FIG. 3B, if the worker thread count<work slot count, there must be at least two work slots that share the same association pile. We need to associate one of these slots (e.g. work slot 310c or work slot 310d) with a new association pile and also create a new worker thread for the new association pile. Meanwhile, the old association pile 320c is still processed by the worker thread 330c that was responsible for all tasks coming through both of work slots 310c and 310d. If we create a new association pile for work slot 310d we need to make sure that all tasks that work slot 310d put in the shared association pile 320c are completed before the new association pile associated with work slot 310d is activated, in order to maintain FIFO ordering of tasks.

Referring again to FIG. 4B, at step 416 a slot which is sharing an association pile is selected (e.g. Work Slot 310d of FIG. 3B). At step 418 a new association pile is created and associated with the work slot selected in step 416. However, the corresponding daemon is not started immediately. Instead at step 420 a synthetic StartWorker job is added to the to the old shared association pile (e.g. association pile 320c of FIG. 3B). By the time the StartWorker job is processed in the old shared association pile, it is guaranteed by first-in-first out ordering that all previously posted jobs in the old shared association pile formerly associated with work slot 310d slot are processed. Thus, when the synthetic StartWorker job is processed, at step 422, a new worker thread is started and associated with the new association pile associated with the work slot selected in step 416. Then proceed to step 430 ending the process for adding a worker thread.

FIG. 4B shows a method of removing a worker thread from the scalable thread pool of FIGS. 3A and 3B in response to a determination that one or more threads should be removed from the thread pool. At step 450, start the process to remove a worker thread from the scalable thread pool. At step 452, compare the current thread count to the work slot count. If the determination is made 454 that the worker thread count>work slot count, such as shown, for example, in FIG. 3A, proceed to step 456. At step 456 select one of the work slots that is served by the largest number of worker threads (e.g. select one of work Slots 310a, 310b, or 310c from FIG. 3A). At step 458 add a synthetic StopWorker job to the thread pool via the work slot selected in step 456. Then proceed to step 480 ending the process for removing a worker thread. When the StopWorker job is polled it will stop whichever thread processes it. Thus reducing the number of worker threads serving that slot. For example a StopWorker job place in work slot 310a will be placed in association pile 320a and the polled by one of worker thread 330a and 330b stopping whichever thread polls the StopWorker job from the association pile 320a.

However, if the determination is made 464 that the worker thread count<=work slot count, such as shown, for example, in FIG. 3B, proceed to step 466. If the worker thread count<=work slot count, every pile is processed by one and only one worker thread. Thus, if a worker thread is to be stopped, an association pile will also have to be removed and the slot(s) associated with the removed association pile redirected. At step 466, select an association pile (P1) that is shared by the smallest number of work slots (e.g. Association Pile 320a in FIG. 3B). At step 468 add a StopWorker job to the association pile (P1) selected in step 466. When the "StopWorker" executes it will: Close all work slots (e.g. work slot 310a Of FIG. 3B) corresponding to P1 at step 470; find a pile (P2) that is shared with the next smallest number of slots (e.g. association pile 320b in FIG. 3B) at step 472; and at step 474, merge the content of P1 (e.g. association pile 320a in FIG. 3B) into P2 (e.g. association pile 320b in FIG. 3B) and discard P1 (e.g. Association Pile 320a in FIG. 3B) and redirect all closed slots (e.g. worker slot 310a of FIG. 3B) to P2 (e.g. association pile 320b in FIG. 3B) and re-open the closed slot(s). Then proceed to step 480 ending the process for removing a worker thread.

Dynamic Thread Pool Resizing

In embodiments, the present disclosure describes a system and method which supports dynamic thread pool sizing suitable for use in multi-threaded processing environment such as a distributed data grid. Dynamic thread pool resizing can be performed, for example, in a scalable thread pool associated with a service thread in the distributed data grid. Dynamic thread pool resizing utilizes measurements of thread pool throughput and worker thread utilization in combination with analysis of the efficacy of prior thread pool resizing actions to determine whether to add or remove worker threads from a thread pool in a current resizing action. Furthermore, the dynamic thread pool resizing system and method can accelerate or decelerate the resizing analysis and, thus, the rate of worker thread addition and removal depending on the needs of the system. Optimizations are incorporated to prevent settling on a local maximum throughput. The dynamic thread pool resizing system and method thereby provides rapid and responsive adjustment of thread pool size in response to changes in work load and processor availability.

In accordance with an embodiment of the invention, the distributed data grid can dynamically size/resize the scalable thread pool to maximize the throughput of the pool and minimize the utilization of system resources. The above description provides methods for adding threads to and removing threads from the scalable thread pool of FIGS. 3A and 3B. The following description provides methods for determining when to add and remove threads from the scalable thread pool in response to changes in work load and processor availability.

The number of threads can be dynamically changed based on workload. The method used to determine when to create or destroy threads will have an impact on the overall performance. If too many threads are created, resources are wasted and time is wasted creating unused threads. If too many threads are destroyed time/resources will be wasted creating new threads when required. Creating threads too slowly might result in long wait times. Destroying idle threads too slowly may starve other processes of resources. Thus, the number of threads in a thread pool and the mechanism for determining when and how fast to add threads to the thread pool can significantly affect performance of the thread pool, the service thread using the thread pool, and other threads sharing resources of the computer system.

In a distributed data grid as described above, the workload may change significantly from service thread to service thread and over time with respect to each service thread. Adding complexity is the fact that in a distributed data grid, a number of distributed cache services for different named caches may operate in the same node simultaneously. Furthermore multiple nodes with multiple different service threads may operate on the same server therefore sharing the processor resources. The utilization of these various service threads may also change over time. Thus, in a distributed data grid the optimum size for a thread pool can vary dramatically, based not only on the work presented to the service thread associated with the thread pool, but also based on what work is concurrently being presented to other service threads on the same server. Thus, it is desirable for a dynamic thread pool resizing mechanism to effect resizing in a way that responds rapidly to fluctuations in workload and can settle upon an optimal thread pool size for a particular workload and environment in a short number of iterations.

Figure 5:
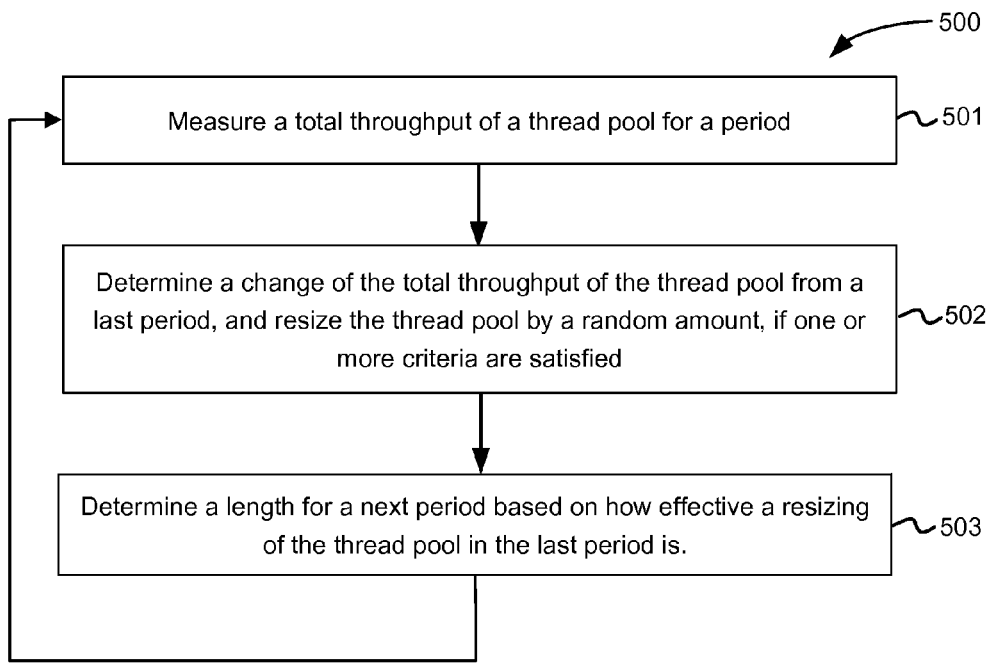
FIG. 5 illustrates a method for dynamic sizing of a scalable thread pool, in accordance with an embodiment of the invention.

FIG. 5 illustrates a system and method for supporting dynamic thread pool sizing in a distributed data grid, in accordance with an embodiment of the invention. As shown in FIG. 5, a thread pool 500, such as a scalable thread pool, can dynamically adjust its thread count. At step 501, the system can measure a total throughput of a thread pool 500 for a period. Then, at step 502, the system can determine a change of the total throughput of the thread pool 500 from a last period and resize the thread pool by a random amount, if one or more criteria are satisfied. Additionally, at step 503, the system can determine a length for a next period based on how effective a resizing of the thread pool 500 in the last period was.

This dynamic thread pool resizing method is used in conjunction with the scalable thread pool of FIGS. 3A and 3B to dynamically adjust the thread count in order to: increase the total throughput of the scalable thread pool and/or minimize the resource utilization of the scalable thread pool. Dynamic resizing is done via a periodic synthetic ResizePool job inserted into the scalable thread pool described above. In general terms the synthetic ResizePool job uses a resizing method which analyzes the performance response to adding or removing threads and uses the results of the analysis to determine whether to add or remove more threads and also to determine how long to wait before reanalyzing performance. Additionally, once a potential maximum throughput has been achieved, the number of threads in the thread pool is periodically increased or decreased by a random amount in an attempt to avoid settling at a local maximum throughput.

The scheduling of periodic synthetic ResizePool job is based on a variable period between resize jobs. The period of time between inserting one ResizePool job and the next ResizePool job is a function of how effective the last resize was. When executing a ResizePool job changes the throughput, the period of time between inserting that ResizePool job and the next ResizePool job is decreased. When executing a ResizePool job does not change the throughput significantly, the period of time between inserting that ResizePool job and the next ResizePool job is increased. The method is essentially an iterative performance analysis experiment and can adjust the thread pool size dynamically to take account changes in workload, throughput, and processor availability based on measurements of throughput and thread utilization alone.

Figure 6:
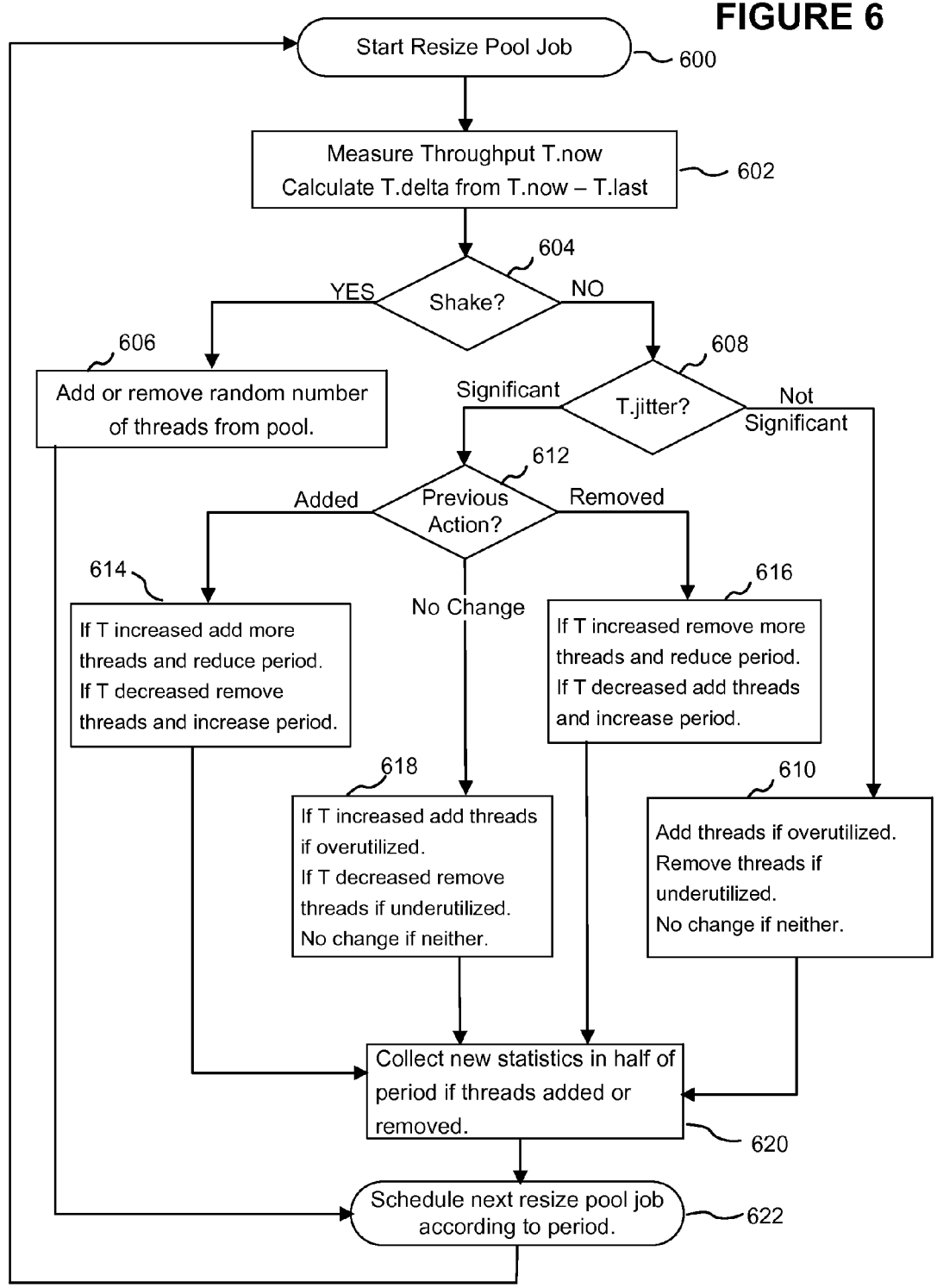
FIG. 6 illustrates a method for dynamic sizing of a scalable thread pool, in accordance with an embodiment of the invention.

FIG. 6 shows an illustration of steps performed in the synthetic ResizePool job. At step 600 the synthetic ResizePool job starts at the expiration of the calculated period and is inserted into the scalable thread pool described above for execution. The job is then polled from an association pile by a worker thread and processed as shown. At step 602, the job first measures the total throughput of the pool (T.now) and the change in total throughput (T.delta) since it last ran (T.last). T.now is stored in memory for use as T.last next time the job is run. At step 604, the job determines if it is time to "shake" the pool. This determination can be made using an iteration counter, or a timer, or the equivalent. If it is time to "shake" the pool, the job performs step 606 and resizes the pool by a random amount and then reschedules itself at step 622. The random amount may be calculated as a random percentage of thread count within a particular range, or a random percentage of a preconfigured number of threads. The ResizePool job starts again at step 600 at the expiration of the calculated period when is inserted again into the scalable thread pool described above for execution.

Referring again to FIG. 6, if it is not time to "shake" the pool at step 604, the job moves on to step 608. At step 608 the job calculates what a "significant" throughput change would be (T.jitter) as a simple function (for example 10% or 5%) of T.last. The job then compares T.delta to T.jitter to see if a significant change in throughput has occurred. To put it another way at step 608, the job determines whether the difference between throughput the last time the job was run and the current throughput represents a significant change in throughput relative to the past throughput. (Alternatively the significance of the change in throughput could be made by comparison to the current throughput instead of the prior throughput).

If there was no significant change in throughput since the job was last run, as determined by comparing T.delta to T.jitter at step 608, the job moves to step 610. At step 610, the job adds one or more threads to the thread pool if the thread pool is overutilized or removes one or more threads from the thread pool if the thread pool is underutilized. If the thread pool is neither overutilized nor underutilized the job makes no change to the thread pool. The thread pool is considered overutilized if the number of active worker threads, at the time the Resize.Pool job is run, is above some fixed percentage of the total worker count (e.g. 66% or 80%). The thread pool is considered underutilized if the number of active worker thread is below some fixed percentage of the total worker count (e.g. 33% or 20%). Note that even where a thread pool is "maxed out" i.e. the thread pool cannot perform any additional work, the indicated thread utilization will be less than 100% because a fraction of the worker threads will be "between jobs" at any moment. After adding threads, removing threads or making no change to the number of threads, the job moves to step 620.

If there was a significant change in throughput since the job was last run detected at step 608, the next action taken by the job depends upon what action was taken the last time the job was performed (previous resizing action). Thus, the previous resizing action (i.e. adding threads, removing threads or taking no action) is determined at step 612. The previous resizing action is typically recorder in a state associated with the Resize.Pool job along with other values such as T.now/T.last and the current duration of the period. These values may be stored for example in memory, such that the Resize.Pool job has access to them each time it runs.

If threads were added in the previous action, the job moves to step 614. At step 614, if T.delta indicates an increase in throughput, the job adds one or more additional threads to the thread pool and reduces the period of time before the next analysis. At step 614, if T.Delta indicates a decrease in throughput, the job removes one or more threads from the thread pool and increases the period of time before the next analysis. A decrease in throughput in response to adding threads can be indicative that too many threads have been added, e.g. in response to increasing workload, "overshooting" the optimal number of threads. Thus, one or more threads are removed and analysis is decelerated to dampen oscillations. After adding threads or removing threads the job moves to step 620.

If threads were removed in the previous action, the job moves to step 616. At step 616, if T.delta indicates an increase in throughput, the job removes one or more further threads from the thread pool and reduces the period of time before the next analysis. At step 616, if T.delta indicates a decrease in throughput, the job adds back one or more threads to the thread pool and increases the period of time before the next analysis. A decrease in throughput in response to removing threads can be indicative that too many threads have been removed, e.g. in response to diminishing workload, "undershooting" the optimal number of threads. Thus, one or more threads are added back and analysis is decelerated to dampen oscillations. After adding threads or removing threads the job moves to step 620.

Where the ResizePool job determines that a resizing action should be performed to add or remove worker threads from the scalable thread pool, the ResizePool job causes addition or removal of worker threads by inserting one or more StartWorker job or StopWorker job into the thread pool as described above with respect to FIGS. 4A and 4B. The number of threads added or removed in the steps described above (and consequently the number of StartWorker job or StopWorker job which should be inserted into the thread pool) should be selected so as to be effective for the thread pool in which the job is running. Thus, for a thread pool with a larger thread count, a larger number of threads can be added or removed in each operation. For a thread pool with a smaller thread count, a smaller number of threads can be added or removed in each operation. The number of threads added or removed in a step can in one embodiment be determined based on a function of the current thread count, for example 5%, 10%, or 20% of the current thread count. In the overshoot and undershoot examples given above a lower number of threads may be added or removed to correct the overshoot, for example, half the number of threads added or removed in the prior operation. Alternatively the number of threads added or removed in a thread can be fixed (for example one thread at a time).

It should be noted that the rate of thread addition or removal from the thread pool will depend on the number of threads added or removed in each iteration of the Resize.Pool job and the frequency at which Resize.Pool jobs are performed. Thus, if the period is reduced, the frequency of Resize.Pool job increases and thus more iterations are performed in unit time. Thus more additions of removals of worker threads can also be performed in unit time. This allows the dynamic resizing system and method to respond rapidly to changes in throughput, workload and other factors such as processor availability.

If no change in the number of threads was made in the previous action, the job moves to step 618. At step 618, if T.delta indicates an increase in throughput and the thread pool is overutilized, the job adds one or more threads to the thread pool. At step 618, if T.delta indicates a decrease in throughput and the thread pool is underutilized, the job removes one or more threads from the thread pool. If neither of the above statements are true, the job makes no change to the thread pool. After adding threads, removing threads or making no change to the number of threads, the job moves to step 620.

At step 620, if a decision was made in any of the previous steps to add or remove threads, the synthetic "ResizePool" job schedules itself to run again in half of its new period in order to gather new throughput statistics after the system has had a chance to settle down. After gathering new throughput statistics (or directly if no change to the number of threads was made), the synthetic "ResizePool" job schedules itself to run again in its new period which restarts the job again at step 600 after expiration of the period. Additionally, the resizing action taken should be stored in memory such that the next iteration of the ResizePool job will have access to information indicating the pervious resizing action taken. The ResizePool job will be run repeatedly and iteratively adjusting the number of worker threads in the thread pool in response to the throughput and thread utilization measures and accelerating or decelerating analysis by increasing or decreasing the delay period before the next job in response to the efficacy of a prior resizing action as described above.

In embodiments of the present invention, the distributed data grid 100 implements one or more scalable thread pool system and method as described below and illustrated in FIGS. 2, 3A, 3B, 4A, and 4B. In embodiments of the present invention, distributed data grid 100 implements one or more system and method for dynamic resizing of a scalable thread pool as described below and illustrated in FIGS. 5 and 6. In particular embodiments, the scalable thread pool system and method and/or the system and method for dynamic resizing of a scalable thread pool may be implemented with respect to one or more service thread operating on nodes of the distributed data grid 100, including for example, the cache service thread, and proxy service thread.

Figure 7:
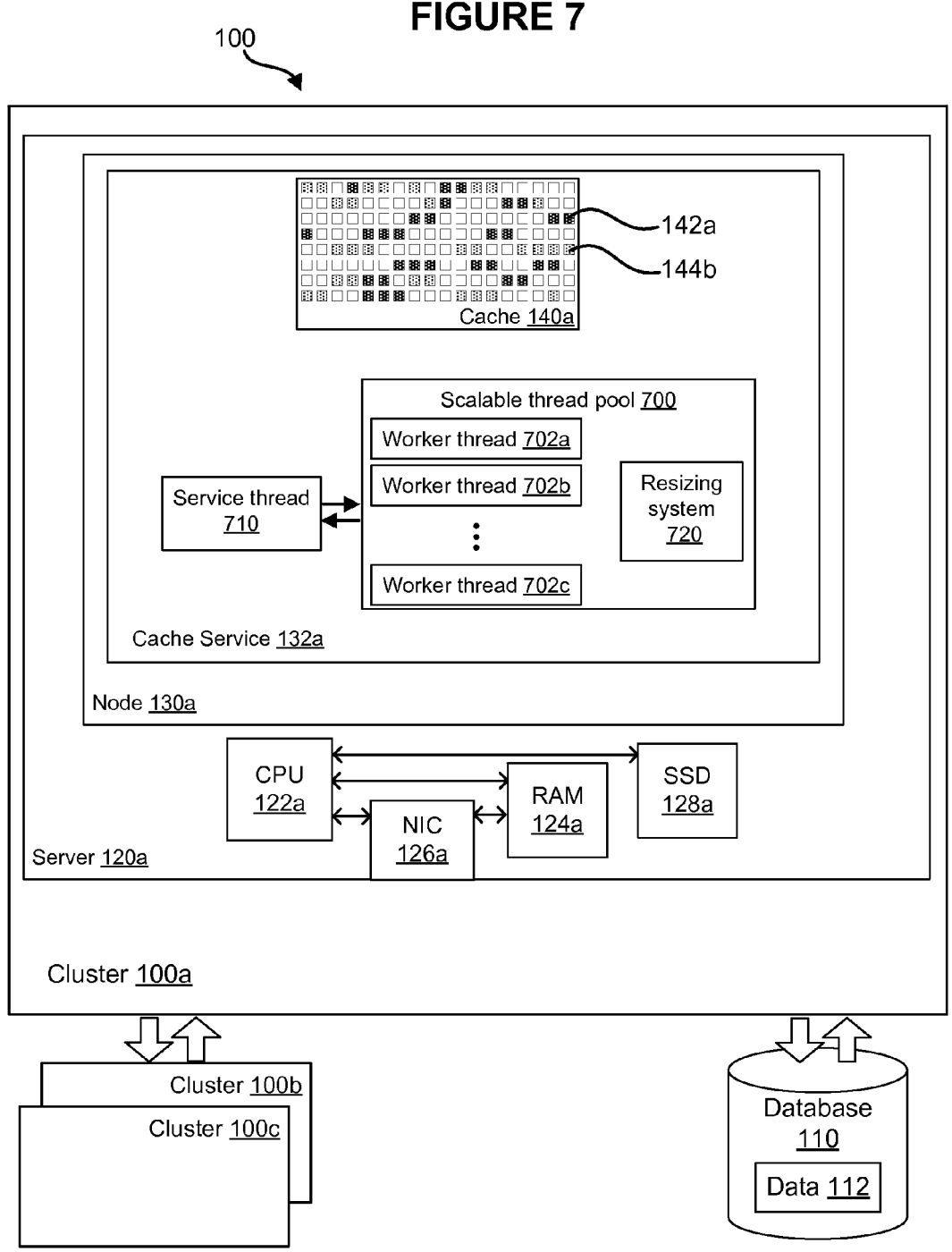
FIG. 7 illustrates implementation of a scalable thread pool and a system for dynamic resizing of a scalable thread pool in a distributed data grid, in accordance with an embodiment of the invention.

FIG. 7 illustrates implementation of a scalable thread pool and a system for dynamic resizing of a scalable thread pool in a distributed data grid, in accordance with an embodiment of the invention. As shown, for example, in FIG. 7, a service provided by a node 130*a* in a distributed data grid 100 can be provided by a service thread 710. The service may be, for example, a cache service 132*a*. To provide extra processing resources, the service thread 710 may perform work in cooperation with a scalable thread pool 700 comprising a scalable number of worker threads (three shown) 702*a*, 702*b*, 702*c*. In an embodiment, the scalable thread pool 700 implements the scalable thread pool system and method as described above and illustrated in FIGS. 2, 3A, 3B, 4A, and 4B. The scalable thread pool includes a resizing system 720 for adjusting the number of threads in the scalable thread pool 700 based on throughput and thread utilization. In an embodiment, the resizing system 720 implements the system and method for dynamic resizing of a scalable thread pool as described above and illustrated in FIGS. 5 and 6. Although service thread 710 of cache service 132a is shown for illustrative purposes, the scalable thread pool 700 and resizing system 720 may also be implemented with respect to a wide variety of other threads in distributed data grid 100 where the thread operates in cooperation with a thread pool of worker threads.

By providing a scalable thread pool and a system and method for dynamic resizing of the scalable thread pool in response to thread utilization and throughput the present disclosure enhance operation of a thread such as a service thread in the distributed data grid which utilizes the scalable thread pool to provide additional resources to the service thread thereby improve performance of the distributed data grid and the ability of the distributed data grid to respond to changing demands. While described with respect to a distributed data grid this scalable thread pool and dynamic resizing system and method described above is also applicable to a wide variety of situations in which a thread uses a thread pool to provide additional resources and needs to scale to cope with variable demand. For example the scalable thread pool and dynamic resizing system and method described above is applicable in a wide variety of multi-threaded processing environments and applications.

While various embodiments of the present invention have been described above, it should be understood that they have been presented by way of example, and not limitation. It will be apparent to persons skilled in the relevant art that various changes in form and detail can be made therein without departing from the spirit and scope of the invention.

Many features of the present invention can be performed in, using, or with the assistance of hardware, software, firmware, or combinations thereof. The present invention may be conveniently implemented using one or more conventional general purpose or specialized digital computer, computing device, machine, or microprocessor, including one or more processors, memory and/or computer readable storage media programmed according to the teachings of the present disclosure. Features of the invention may also be implemented in hardware using, for example, hardware components such as application specific integrated circuits (ASICs) and programmable logic device. Implementation of the hardware state machine so as to perform the functions described herein will be apparent to persons skilled in the relevant art.

Features of the present invention can be incorporated in software and/or firmware for controlling the hardware of a processing system, and for enabling a processing system to interact with other mechanisms utilizing the results of the present invention. Such software or firmware may include, but is not limited to, application code, device drivers, operating systems and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In embodiments, the storage medium or computer readable medium can be non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for providing a scalable thread pool to perform an ordered plurality of task elements received from a calling thread in a multi-threaded processing environment, the method comprising:

providing one or more association piles configured to hold task elements;

providing two or more work slots, each work slot being directed to exactly one association pile, such that each task element of the ordered plurality of task elements provided to said work slot by said calling thread, is provided by said calling thread via said work slot to said exactly one association pile to which the work slot is directed;

associating a first key with a first task element of the ordered plurality of task elements;

associating said first key with a second task element of the ordered plurality of task elements;

providing one or more worker threads associated with each of said one or more association piles, each worker thread configured to poll task elements from an associated association pile, perform said task elements, and release said task elements when completed;

configuring each association pile such that pending task elements polled from the association pile by a worker thread are held in said association pile until released by said worker thread upon completion of the task;

polling, by a first worker thread of the one or more worker threads, the first task element;

configuring each association pile to prevent, based on said first key, polling of said second task element by a second worker thread of the one or more worker threads before said first task element is released by the first worker thread; and polling, by the second worker thread, a third task element associated with a second key before the first worker thread releases the first task element, wherein the third task was received in the same association pile as the second task and after the second task.

2. The method of claim 1, wherein the one or more worker threads are more numerous than the two or more work slots, and wherein providing one or more association piles configured to hold task elements comprises:

providing a dedicated exactly one association pile for each of said two or more work slots.

3. The method of claim 1, wherein the two or more work slots are more numerous than the one or more worker threads, and wherein providing one or more association piles configured to hold task elements comprises:
providing exactly one association pile for each of said one or more worker threads.

4. The method of claim 1, further comprising:
configuring said calling thread such that the first task element and the second task element are provided via the same work slot of said two or more work slots.

5. The method of claim 1, wherein the first and second keys are unique keys that identify a datum in a distributed data grid.

6. The method of claim 1, further comprising:
associating each task element of said plurality of task elements with a key; and
configuring said calling thread such that all task elements having the same key are provided via the same work slot of said two or more work slots.

7. The method of claim 1, wherein the one or more worker threads are more numerous than the two or more work slots, and wherein the method further comprises:
adding a worker thread by placing a Start.Worker job in whichever of the association piles is associated with the fewest worker threads whereby when said Start.Worker job is performed a new worker thread will be created associated with said association pile.

8. The method of claim 1, wherein the one or more worker threads are more numerous than the two or more work slots, and wherein the method further comprises:
removing a worker thread by placing a Stop.Worker job in whichever of the association piles is associated with the most worker threads whereby when said Stop.Worker job is performed a worker thread associated with said association pile will be stopped.

9. The method of claim 1, wherein the work slots are more numerous than the one or more worker threads, and wherein the method further comprises:
adding a worker thread by placing a Start.Worker job in whichever of the association piles is associated with the largest number of work slots whereby when said Start-.Worker job is performed a new association pile will be created associated with said work slot and a new worker thread will be created associated with said association pile.

10. The method of claim 1, wherein the work slots are more numerous than the one or more worker threads, and wherein the method further comprises:
removing a worker thread by placing a Stop.Worker job in whichever of the association piles is associated with the smallest number of work slots whereby when said Stop.Worker job is performed, the worker thread associated with said association pile will be stopped, and said association pile will be merged into another association pile.

11. A system for providing a scalable thread pool to perform an ordered plurality of task elements received from a calling thread in a multi-threaded processing environment, the system comprising:
a computer system having a memory and a processor, wherein the processor has a plurality of cores and is capable of multi-threaded operation;
one or more association piles configured to hold task elements;
two or more work slots, each work slot being directed to exactly one association pile, such that each task element of the ordered plurality of task elements provided to said work slot by said calling thread, is provided by said calling thread via said work slot to said exactly one association pile to which the work slot is directed;
a first task element of the ordered plurality of task elements associated with a first key;
a second task element of the ordered plurality of task elements associated with the first key;
one or more worker threads associated with each of said one or more association piles, each worker thread configured to poll task elements from an associated association pile, perform said task elements, and release said task elements when completed;
wherein each association pile is configured such that pending task elements polled from the association pile by a worker thread are held in said association pile until released by said worker thread upon completion of the task;
wherein a first worker thread of the one or more worker threads polls the first task element;
wherein each association pile is configured to prevent, based on said first key, polling of said second task element by a second worker thread of the one or more worker threads before said first task element is released by the first worker thread; and
wherein the second worker thread polls a third task element associated with a second key before the first worker thread releases the first task element, and wherein the third task was received in the same association pile as the second task and after the second task.

12. The system of claim 11, wherein the one or more worker threads are more numerous than the two or more work slots, and wherein the system comprises a dedicated exactly one association pile for each of said two or more work slots.

13. The system of claim 11, wherein the two or more work slots are more numerous than the one or more worker threads, and wherein the system comprises exactly one association pile for each of said one or more worker threads.

14. The system of claim 11, wherein the calling thread is configured such that the first task element and the second task element are provided via the same work slot of said two or more work slots.

15. The system of claim 11, wherein the first and second keys are unique keys that identify a datum in a distributed data grid.

16. The system of claim 11, wherein the one or more worker threads are more numerous than the two or more work slots, and wherein the system is configured to add a worker thread by placing a Start.Worker job in whichever of the association piles is associated with the fewest worker threads whereby when said Start.Worker job is performed a new worker thread is created associated with said association pile.

17. The system of claim 11, wherein the one or more worker threads are more numerous than the two or more work slots, and wherein the system is configured to remove a worker thread by placing a Stop.Worker job in whichever of the association piles is associated with the most worker threads whereby when said Stop.Worker job is performed a worker thread associated with said association pile is stopped.

18. The system of claim 11, wherein the work slots are more numerous than the one or more worker threads, and wherein the system is configured to add a worker thread by placing a Start.Worker job in whichever of the association piles is associated with the largest number of work slots whereby when said Start.Worker job is performed a new association pile will be created associated with said work slot and a new worker thread is created associated with said association pile.

19. The system of claim 11, wherein the work slots are more numerous than the one or more worker threads, and wherein the system is configured to remove a worker thread by placing a Stop.Worker job in whichever of the association piles is associated with the smallest number of work slots whereby when said Stop.Worker job is performed, the worker thread associated with said association pile will be stopped, and said association pile is merged into another association pile.

20. A non-transitory computer readable medium including instructions stored thereon for providing a scalable thread pool to perform an ordered plurality of task elements received from a calling thread in a multi-threaded processing environment, which instructions, when executed, cause a computer system to perform steps comprising:

providing one or more association piles configured to hold task elements;

providing two or more work slots, each work slot being directed to exactly one association pile, such that each task element of the ordered plurality of task elements provided to said work slot by said calling thread, is provided by said calling thread via said work slot to said exactly one association pile to which the work slot is directed;

associating a first key with a first task element of the ordered plurality of task elements;

associating said first key with a second task element of the ordered plurality of task elements;

providing one or more worker threads associated with each of said one or more association piles, each worker thread configured to poll task elements from an associated association pile, perform said task elements, and release said task elements when completed;

configuring each association pile such that pending task elements polled from the association pile by a worker thread are held in said association pile until released by said worker thread upon completion of the task;

polling, by a first worker thread of the one or more worker threads, the first task element;

configuring each association pile to prevent, based on said first key, polling of said second task element by a second worker thread of the one or more worker threads before said first task element is released by the first worker thread; and polling, by the second worker thread, a third task element associated with a second key before the first worker thread releases the first task element, wherein the third task was received in the same association pile as the second task and after the second task.

* * * * *

UNITED STATES PATENT AND TRADEMARK OFFICE
CERTIFICATE OF CORRECTION

| | | |
|---|---|---|
| PATENT NO. | : 9,921,870 B2 | Page 1 of 1 |
| APPLICATION NO. | : 14/857458 | |
| DATED | : March 20, 2018 | |
| INVENTOR(S) | : Gleyzer et al. | |

It is certified that error appears in the above-identified patent and that said Letters Patent is hereby corrected as shown below:

In the Drawings

On sheet 5 of 8, in FIGURE 4B, under Reference Numeral 458, Line 1, delete "synthentic" and insert -- synthetic --, therefor.

On sheet 5 of 8, in FIGURE 4B, under Reference Numeral 468, Line 1, delete "synthentic" and insert -- synthetic --, therefor.

In the Specification

In Column 13, Lines 56-57, delete "to the to the" and insert -- to the --, therefor.

In Column 14, Line 34, delete "Of" and insert -- of --, therefor.

In Column 17, Line 23, delete "Delta" and insert -- delta --, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*